United States Patent [19]
O'Connor

[11] 4,088,032
[45] May 9, 1978

[54] SERVO HEAD STRUCTURE

[75] Inventor: Thomas J. O'Connor, Ann Arbor, Mich.

[73] Assignee: Easco-Sparcatron, Inc., Ann Arbor, Mich.

[21] Appl. No.: 552,194

[22] Filed: Feb. 24, 1975

[51] Int. Cl.² .............................................. F16H 21/16
[52] U.S. Cl. ........................................ 74/25; 74/89.2; 219/69 E
[58] Field of Search ............ 219/69 E; 74/89.2, 89.22, 74/25

[56] References Cited

U.S. PATENT DOCUMENTS

| | | | |
|---|---|---|---|
| 2,945,936 | 7/1960 | Carman | 219/69 E |
| 3,202,000 | 8/1965 | Fischer | 74/89.22 |
| 3,222,494 | 12/1965 | O'Connor | 219/69 E |
| 3,539,063 | 11/1970 | Masura | 74/89.2 |
| 3,873,800 | 3/1975 | Brettrager | 219/69 E |

FOREIGN PATENT DOCUMENTS

| | | | |
|---|---|---|---|
| 771,235 | 4/1954 | United Kingdom | 219/69 E |
| 908,195 | 7/1961 | United Kingdom | 219/69 E |

Primary Examiner—Benjamin W. Wyche
Assistant Examiner—Wesley S. Ratliff, Jr.
Attorney, Agent, or Firm—Whittemore, Hulbert & Belknap

[57] ABSTRACT

Servo head structure for electrical discharge machining or the like comprising a rectangular frame having a rectangular ram positioned therein, bearing means for guiding the rectangular ram for movement in the frame, a shaft rotatably mounted in the frame and extending through the ram, a rotary hydraulic servo motor secured to the frame and connected to the shaft for rotation of the shaft, and cable means secured at opposite ends thereof to opposite ends of the ram and wrapped around the shaft centrally thereof, whereby on rotation of the servo motor controlled movement of the ram with respect to the frame is accomplished.

13 Claims, 6 Drawing Figures

SERVO HEAD STRUCTURE

BACKGROUND OF THE INVENTION

1. Field of the Invention

The invention relates to machine tool servo head structure and refers more specifically to servo head structure for electrical discharge machining equipment or the like including a ram movable within guides in a frame in accordance with the rotation of a shaft by a rotary servo electric hydraulic motor, which shaft is secured to the frame and is operably connected to the ram by cable means wrapped around the shaft and secured at its opposite ends to the opposite ends of the ram.

2. Description of the Prior Art

In the past, machine tool heads have generally been constructed of a ram movable in a guide actuated by a hydraulic piston and cylinder acting between the frame and guide. Also in the past, ball nut and screw structure secured between a frame and guide has been used to drive rams in machine tool heads. Such structure is both expensive and subject to an undesirable degree of backlash and inaccurate alignment. Wherein particularly precise ram movement has been accomplished in the past, the structures used therefor have been complicated and therefore expensive and often inefficient.

SUMMARY OF THE INVENTION

The servo head structure of the invention includes a rectangular frame constructed of four rectangular members secured together by bolts or the like, a generally rectangular ram having a U-shaped cross section movable within the rectangular frame, adjustable guide means for guiding the ram for movement within the frame, a shaft secured for rotation within the frame extending through the ram, a rotary hydraulic motor for rotation of said shaft, and a cable wound around the shaft centrally thereof and connected at the opposite ends of the cable to opposite ends of the ram.

The servo head structure is particularly economical to produce in that substantially all machining is of flat rectangular parts, the tolerances of most of which are not critical, and assembly of the head structure and alignment of the ram within the frame is particularly simple. Further, relative movement between the frame and ram is particularly efficient in that the cable tension can be adjusted to prevent backlash and misalignment is substantially eliminated.

DESCRIPTION OF THE PREFERRED EMBODIMENT

Figure 3:
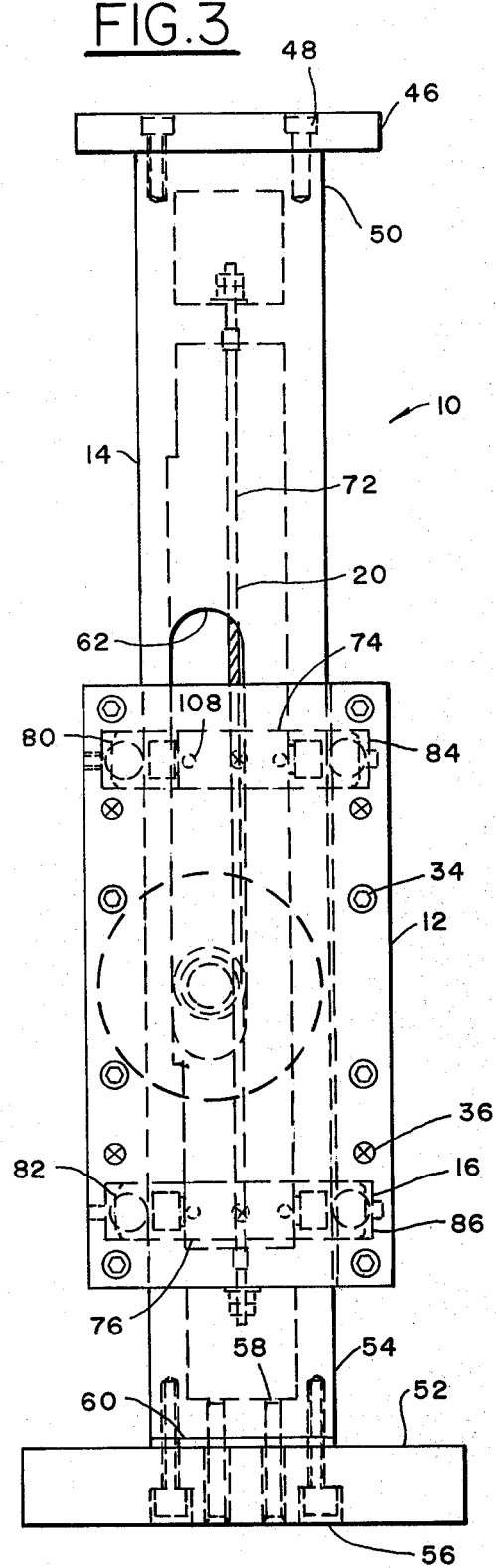
FIG. 3 is an enlarged partial front view of the servo head structure illustrated in FIG. 1.
Figure 4:
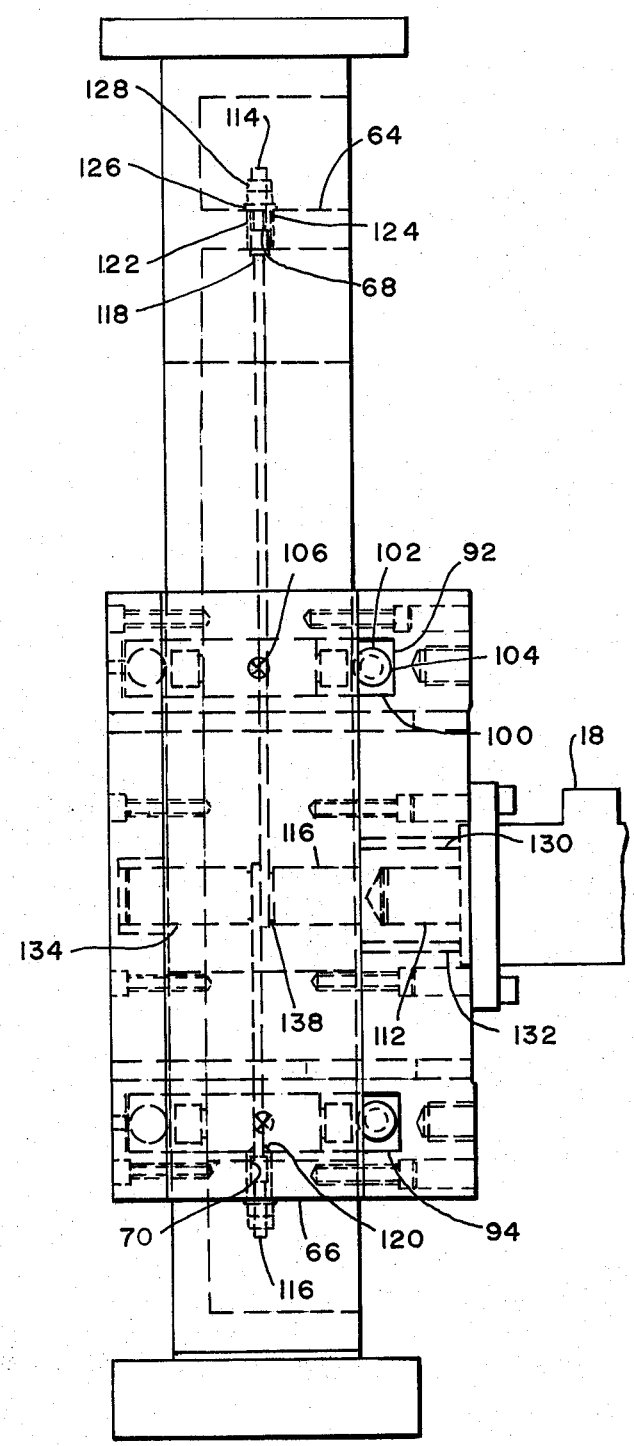
FIG. 4 is an enlarged partial elevation view of the servo head structure illustrated in FIG. 1.

As shown best in FIGS. 3 and 4, the servo head structure 10 includes the frame 12 adapted to be secured to an electrical discharge machining machine tool or the like and a ram 14 extending through the frame 12 for reciprocal movement relative thereto. The servo head 10 further includes guide means 16 for guiding the reciprocal movement of the ram 14 within the frame 12, a rotary motor 18 and drive means 20 for movement of the ram 14 relative to the frame in accordance with the actuation of the motor 18.

Figure 1:
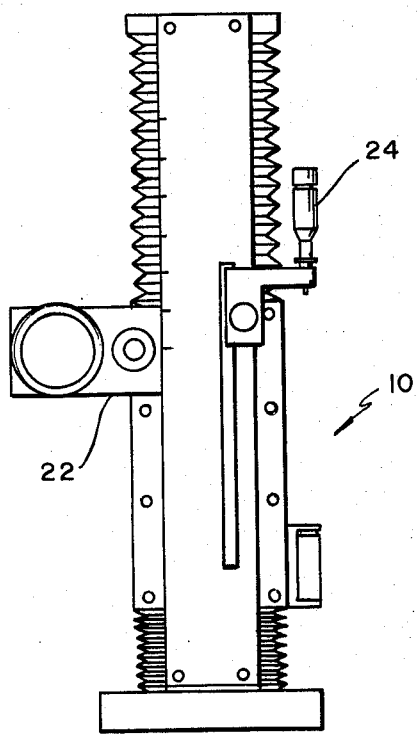
FIG. 1 is a front elevation of a servo head structure constructed in accordance with the invention.
Figure 2:
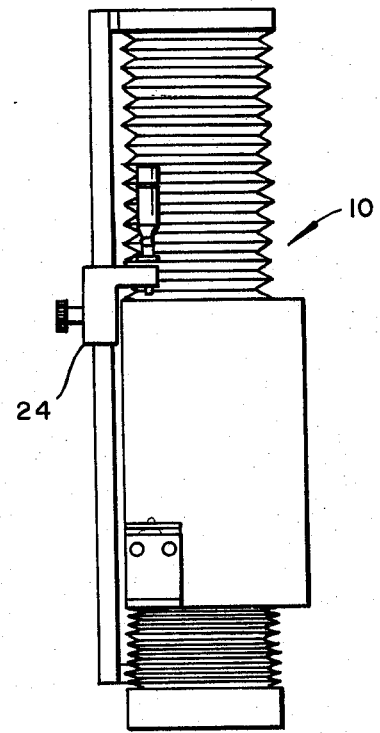
FIG. 2 is a side elevation view of the servo head structure illustrated in FIG. 1.
Figure 5:
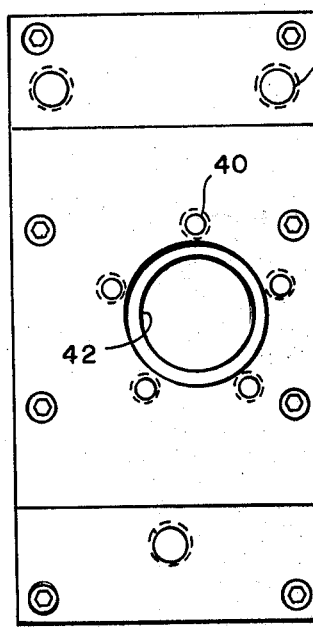
FIG. 5 is a section view of the servo head structure of FIG. 4, taken in the direction of line 5—5 in FIG. 4.

As shown best in FIGS. 1 and 2, the servo head structure 10 has travel dial structure 22 associated therewith for indicating the relative movement between the frame 12 and the ram 14. A depth stop 24 is also provided in conjunction with the servo head 10 operable between the frame 12 and ram 14 in response to predetermined movement of the ram 14 relative to the frame 12.

The frame 12 includes a front 26, two sides 28 and 30 and a back 32. The front 26 and back 32 are secured to the sides 28 and 30 by means of bolts 34 and dowel pins 36. Threaded openings 38 are provided in the back 32 of the frame 12 to facilitate securing of the frame 12 to a machine tool by means of bolts or the like. Similarly, threaded openings 40 are provided in the back 32 for mounting the rotary motor 18 on the frame 12 adjacent the shaft opening 42 through the frame.

Figure 6:
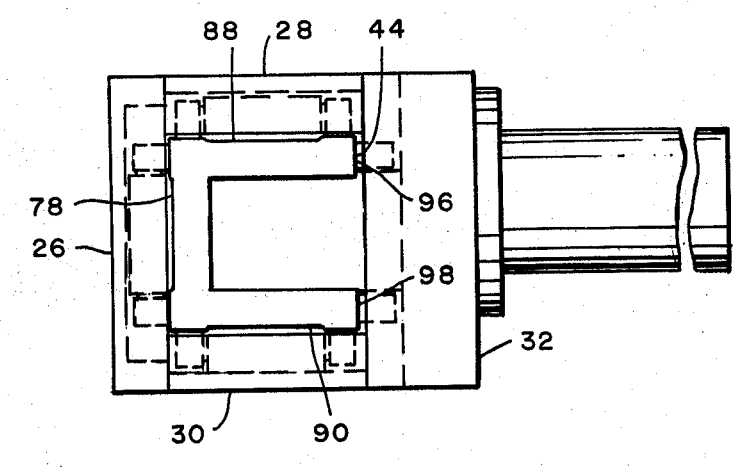
FIG. 6 is a cross section of the servo head structure of FIG. 4, taken substantially on the line 6—6 in FIG. 4.

The ram 14, as shown in cross section best in FIG. 6, is substantially U-shaped in cross section and has bearing surfaces 44 on all four sides thereof. A cap 46 is secured to the top of the ram 14 by convenient means such as bolts 48. A platen 52 for receiving electrical discharge machining electrodes 50 is secured to the lower end 54 of the ram 14 by convenient means such as bolts 56 and dowel pins 58. The platen 52, bolts 56 and dowel pins 58 are insulated from the ram 14 by insulating material 60. A shaft slot 62 is provided in the ram, as shown. Plates 64 and 66 are positioned across the U-shaped cross section of the ram 14 at the upper and lower ends, respectively, having openings 68 and 70 therein for receiving the ends of the cable 72 of the drive means 20.

The guide means 16, as shown best in FIGS. 3, 4 and 6, includes bearing structures 74 and 76 between the top and bottom of the front 20 of the frame 12 and the front 78 of the ram 14, bearing structures 80 and 82 and 84 and 86 between the top and bottom of the sides 28 and 30 of the frame 12 and the sides 88 and 90 of the ram 14, and the bearing structures 92 and 94 at the top and bottom of the back 32 of the frame 12 between the back 32 of the frame 12 and the bearing surfaces 44 on the edges 96 and 98 of the sides 80 and 90 of the ram 14.

Each of the bearing structures 74, 76, 80, 82, 84, 86, 92 and 94 are identical and include a rectangular bearing housing 100 and a pair of roller bearings 102 on each end of a shaft 104 extending through the bearing housing 100, as shown, in conjunction with the bearing structure 92 in FIG. 4. The bearing structures are positioned in slots in the front, sides and back of the frame, as shown.

The bearings 102 engage the surfaces of the ram 14 as shown best in FIG. 6. The bearing structures 84, 86, 92 and 94 are stationary and may be located on locating pins 106, as desired, in the side 30 and back 32 of frame 12. The bearing structures 74 and 76 and 80 and 82 may similarly be located on locator pins in the front 26 and the side 28 of the frame 12 and are adjustable transversely of the ram 14 by means of preloading set screws 108. The alignment of the ram 14 and preloading thereof may thus be readily accomplished by adjusting the bearing structures 74, 76, 80 and 82, as desired.

The motor 18 as shown is a rotary hydraulic or electric servo motor suitable for controlled rotation by electro-hydraulic servo valves, as is known in the electrical discharge machining art. The rotary hydraulic motor 18 is offset centrally of the ram 14 and frame 12, as shown, to place the cable 72 of the drive means 20 substantially on center of the ram 14 with the cable 72 wrapped around the rotatable shaft 110 of the drive means 20. A drive shaft 112 extends from the motor 18 through the opening 42 in the back of the frame 12, as shown best in FIG. 4.

The drive means 20 includes the cable 72, which as previously indicated is wrapped around the shaft 110 so as to be in frictional engagement therewith. Coupling structure 114 and 116 is provided in conjunction with the upper end 118 and lower end 120 of the cable 72 for securing the cable 72 under adjustable tension to the plates 64 and 66 of the ram 14. As shown, each coupling structure includes a threaded stud 122 secured to one end of a coupling sleeve 124 with the cable 72 secured to the other end of the coupling sleeve 124, a washer 126 placed over the threaded stud 122, and a pair of nuts 128 threaded on the stud 122.

The drive means 20 further includes the shaft 110 which has a larger diameter portion 130 engaged for rotation with the shaft 112 of the motor 18 and rotatably positioned in the bearings 132 at one end of the shaft 110 and the smaller diameter portion 134 journalled for rotation in the bearings 136 positioned at the other end of the shaft 110. Bearings 132 are secured in the opening 42 in the back 32 of the frame 12, while the bearing 136 is secured in the front 26 of the frame 12. As shown, the smaller diameter portion 134 of the shaft 110 has an annular recess 138 thereabout for receiving the cable 72 wrapped therearound. The surface of the recess 138 and the cable 72 if necessary may be treated to provide desired frictional engagement therebetween. In addition, the frictional engagement between the cable 72 and the shaft 110 may be altered by the number of turns of the cable 72 on the shaft 134 and the tension in cable 72, as desired.

In overall operation of the servo head structure 10, the motor 18 may be servo driven, as is recognized in the electrical discharge machining art, in accordance with the gap spacing between an electrode and workpiece, and the shaft 110 accordingly rotated to move the portion of the cable 72 wrapped around the shaft 100 proportionally and thus move the ram 14 relative to the frame 12 in accordance with the controlled rotation of the motor 18. The movement of ram 14 with respect to the frame 12 is of course reversible and occurs with substantially no backlash in accordance with the tension of the cable 72 and the frictional engagement of the cable 72 with the shaft 110.

The servo head structure 10, as described above, is particularly advantageous in permitting exact alignment of the ram 14 with respect to the frame 12 with minimum difficulty and is particularly efficient in operation in the lack of backlash during operation which can occur in view of the particular structure utilized in the construction of the servo head structure. Further review of the construction of the servo head structure described will make it readily apparent that the servo head structure disclosed is particularly simple to machine and assemble, since substantially all of the machining is of rectangular parts with parallel surfaces. Also, with the structure disclosed, extreme precision is provided along with adjustable preload which eliminates play in the servo head structure, which play would be very detrimental in electrical discharge machining.

While one embodiment of the present invention has been considered in detail, it will be understood that other embodiments and modifications thereof are contemplated. It is the intention to include all embodiments and modifications as are defined by the appended claims within the scope of the invention.

What I claim as my invention is:

1. A servo head for electrical discharge machining or the like, comprising a frame, a ram positioned within the frame for movement with respect thereto, guide means operable between the frame and ram for guiding the ram in precision movement relative to the frame, a rotary motor secured to the frame, and cable drive means including a rotatable shaft secured in the frame and connected to the motor for rotation thereby and a cable which cable is secured to the ram at opposite ends of the cable and ram and is wound about the shaft centrally of the cable operable between the motor and ram for effecting controlled reciprocal, linear movement of the ram relative to the frame in accordance with rotation of the motor.

2. Structure as set forth in claim 1, wherein the frame is generally rectangular and has a rectangular opening therethrough, the ram is rectangular and is received in the rectangular opening, and the guide means are bearings positioned between the frame and ram which are adjustable on at least two relatively perpendicular sides of the frame and ram.

3. Structure as set forth in claim 1, wherein the motor is offset with respect to the center of movement of the ram.

4. Structure as set forth in claim 1, wherein the frame is constructed of four separate pieces including two sides, a front and a back which are secured together by bolts.

5. Structure as set forth in claim 1, wherein the ram has a subtantially U-shaped cross section including a front and two parallel sides each of which have bearing surfaces thereon.

6. Structure as set forth in claim 1, wherein the guide means includes separate rollers secured to the frame at the top and bottom of the front, two sides and back thereof, each including separate roller members at the edges of the ram.

7. Structure as set forth in claim 1, wherein the rotary motor comprises a rotary hydraulic servo motor and, the cable drive means shaft extends through the ram across the frame.

8. A servo head for electrical discharge machining or the like, comprising a frame which is rectangular and has a rectangular opening extending therethrough, a ram positioned within the frame which is rectangular and extends through the rectangular opening in the frame for movement with respect thereto, guide means comprising bearings at the top and bottom of the frame on each of the front, two sides and back of the frame, each of which has a pair of rollers engaged with the ram at the edges thereof between the frame and ram for guiding the ram in precision movement relative to the frame, a rotary hydraulic motor secured to the frame and cable drive means including a shaft driven by said motor and rotatably secured in the frame and a cable secured to the ram at opposite ends thereof and wrapped around the shaft between the two ends of the ram operable between the motor and ram for effecting controlled reciprocal, linear movement of the ram relative to the frame in accordance with the rotation of the motor.

9. Structure as set forth in claim 8 and further including a travel dial secured to one of the frame and ram and engaged with the other for recording the relative movement of the frame and ram.

10. Structure as set forth in claim 8 and further including a depth stop having separate parts secured to both the frame and ram for limiting relative movement between the frame and ram on engagement of the two parts thereof.

11. A servo head for electrical discharge machining or the like comprising a generally rectangular frame having a rectangular opening therethrough, said frame being constructed of four separate pieces including two sides, a front and back which are secured together by bolts having a rectangular opening therethrough, a generally rectangular ram positioned within the frame and received in the rectangular opening therein for movement with respect to the frame, guide means comprising bearings positioned between the frame and ram which are adjustable on at least two relatively perpendicular sides of the frame and ram for guiding the ram in precision movement relative to the frame, and motor means operable between the frame and ram for effecting controlled movement of the ram relative to the frame in accordance with actuation of the motor means.

12. A servo head for electrical discharge machining or the like comprising a generally rectangular frame having a rectangular opening therethrough, a generally rectangular ram positioned within the frame and received in the rectangular opening therein for movement with respect to the frame, which ram has a substantially U-shaped cross section including a front and two parallel sides each of which have bearing surfaces thereon, guide means comprising bearings positioned between the frame and ram which are adjustable on at least two relatively perpendicular sides of the frame and ram for guiding the ram in precision movement relative to the frame, and motor means operable between the frame and ram for effecting controlled movement of the ram relative to the frame in accordance with actuation of the motor means.

13. A servo head for electrical discharge machining or the like comprising a generally rectangular frame having a rectangular opening therethrough, which frame includes a top, a bottom, two sides and a back, a generally rectangular ram positioned within the frame and received in the rectangular opening therein for movement with respect to the frame, guide means comprising bearings positioned within the frame and ram which are adjustable on two relatively perpendicular sides of the frame and ram for guiding the ram in precision movement relative to the frame, which guide means includes separate rollers which are secured to the frame at the top and bottom of the front, two sides and back thereof, and motor means operable between the frame and ram for effecting controlled movement of the frame and ram in accordance with the actuation of the motor means.

* * * * *